United States Patent [19]

Hiketa

[11] Patent Number: 4,697,471
[45] Date of Patent: Oct. 6, 1987

[54] AUTOMATIC TRANSMISSION APPARATUS

[75] Inventor: Manabu Hiketa, Hiroshima, Japan

[73] Assignee: Mazda Motor Corporation, Japan

[21] Appl. No.: 821,288

[22] Filed: Jan. 22, 1986

[30] Foreign Application Priority Data

| | | |
|---|---|---|
| Jan. 30, 1985 [JP] | Japan | 60-16162 |
| Jan. 30, 1985 [JP] | Japan | 60-16163 |
| Jan. 30, 1985 [JP] | Japan | 60-16164 |
| Oct. 29, 1985 [JP] | Japan | 60-242420 |

[51] Int. Cl.$^4$ .......................... F16H 3/08
[52] U.S. Cl. ........................ 74/359; 74/330
[58] Field of Search ........... 74/364, 360, 325, 330, 74/331, 359, 340

[56] References Cited

U.S. PATENT DOCUMENTS

| | | | |
|---|---|---|---|
| 1,759,558 | 5/1930 | Jacobs | 74/359 |
| 1,928,782 | 10/1933 | Church | 74/359 |
| 2,835,137 | 5/1958 | Double | 74/364 |
| 2,991,661 | 7/1961 | Rambausek | 74/330 |
| 3,769,857 | 11/1973 | Whateley | 74/359 |
| 3,893,345 | 7/1975 | Sisson et al. | 74/360 |
| 4,041,791 | 8/1977 | Coy | 74/325 |
| 4,485,687 | 12/1984 | Burke et al. | 74/360 |
| 4,488,446 | 12/1984 | Nishikawa et al. | 74/330 |
| 4,513,631 | 4/1985 | Koivunen | 74/331 |

FOREIGN PATENT DOCUMENTS

| | | | |
|---|---|---|---|
| 0013856 | 2/1979 | Japan | 74/364 |
| 58-225244 | 12/1983 | Japan | |
| 0110947 | 6/1984 | Japan | 74/359 |
| 780106 | 7/1957 | United Kingdom | 74/360 |

*Primary Examiner*—Leslie Braun
*Assistant Examiner*—David Novais
*Attorney, Agent, or Firm*—Gerald J. Ferguson, Jr.; Michael P. Hoffman; Ronni S. Malamud

[57] ABSTRACT

An automatic transmission apparatus comprises an input shaft coupled with an engine output shaft, an output shaft disposed coaxially with the input shaft, a counter shaft disposed in parallel to both the input and output shafts, first and second gears provided on the input shaft and the counter shaft, respectively, to be meshed with each other so as to form a first power transmitting path, a first friction clutch operative selectively to make and break the first power transmitting path, third and fourth gears provided on the input shaft through a one-way clutch and on the counter shaft, respectively, to be meshed with each other so as to form a second power transmitting path, a second friction clutch operative selectively to make and break a third power transmitting path from the input shaft through the one-way clutch to the output shaft, fifth and sixth gears provided on the counter shaft and the output shaft, respectively, to be meshed with each other so as to form a fourth power transmitting path, and a third friction clutch operative selectively to make and break the fourth power transmitting path.

15 Claims, 18 Drawing Figures

AUTOMATIC TRANSMISSION APPARATUS

BACKGROUND OF THE INVENTION

1. Field of the Invention

The present invention relates generally to automatic transmission apparatus for use in vehicles, and more particularly, to an automatic transmission for a vehicle in which each of plural paths for transmitting the output of an engine is selectively formed through a novel gear train arrangement in accordance with the running condition of the vehicle so as to effect automatically a speed range changing operation.

2. Description of the Prior Art

There has been commonly used in vehicles an automatic transmission employing a planetary gear mechanism. When such an automatic transmission with the planetary gear mechanism is arranged to have the increased number of speed ranges for transmitting power for use in a truck or the like, however, a gear train arrangement provided therein is considerably complicated and the whole configuration thereof is increased in size. Accordingly, there has been proposed such an automatic transmission that uses a gear train arrangement which has been conventionally used in a manual transmission and in which a plurality of gear trains each having a different gear ratio are juxtaposed between a couple of parallel shafts and each of the gear trains is selectively brought into a power transmitting state to provide a plurality of speed ranges, and friction clutch devices provided for conducting the selection of the gear train, in order to achieve automatically a speed range changing operation.

However, with the automatic transmission constituted with such a gear train arrangement and friction clutch devices as described above, the following problems are encountered. In the speed range changing operation, a certain gear train is switched over to a power interrupting state from the power transmitting state, while simultaneously another gear train is switched over to the power transmitting state from the power interrupting state, and at that time, a friction clutch device for the former gear train is required to be disengaged, while another friction clutch device for the latter gear train is required to be engaged. In such case, if the disengagement and engagement of the respective friction clutch devices are not proper in timing, both friction clutch devices may be simultaneously engaged or disengaged and this results in a disadvantage that a so-called changing shock is brought about or an engine which is connected to the automatic transmission is caused to be in a racing condition. Further, in the case where it is intended to control the friction clutch devices to be disengaged and engaged respectively with a proper timing for the purpose of avoiding such a disadvantage, control measures which are extremely complicated may be required.

There has been also proposed a gear type transmission having a plurality of gear trains juxtaposed between a couple of parallel shafts and a clutch arrangement including friction clutch devices and one-way clutch devices operative to cause each of the gear trains to be selectively brought into the power transmitting state, as disclosed in the Japanese patent application published before examination with the publication No. 58/225244. However, this gear type transmission employs a manual synchronizing device as means for causing a gear free from one of the parallel shafts to engage the latter and is constituted with an output shaft thereof provided to be not coaxial with an engine output shaft so as to be used in an automobile of a so-called front engine-front drive type.

OBJECTS AND SUMMARY OF THE INVENTION

It is an object of the present invention to provide an automatic transmission apparatus which avoids the aforementioned problems encountered with the prior art.

Another object of the present invention is to provide an automatic transmission apparatus having a gear train arrangement including a plurality of gear trains juxtaposed between a couple of parallel shafts and friction clutch devices, which is constituted to be capable of facilitating the control of timing in operation of the friction clutch devices.

A further object of the present invention is to provide an automatic transmission apparatus having a gear train arrangement including a plurality of gear trains juxtaposed between a couple of parallel shafts and friction clutch devices, which is formed to be compact in its entirety with equipments for a number of speed ranges and is provided with relatively simple control measures operative to control the operation of the friction clutch device to change the speed range without bringing about a changing shock, a racing condition of an engine or the like, so that the speed range changing operation is satisfactorily carried out.

A still further object of the present invention is to provide an automatic transmission apparatus having a gear train arrangement including a plurality of gear trains juxtaposed between a couple of parallel shafts and friction clutch devices, in which a friction clutch device for lower speed ranges is provided with an increased capacity for transmitting power without increasing each of external dimensions of the apparatus.

According to an aspect of the present invention, there is provided an automatic transmission apparatus comprising an input shaft coupled with an engine output shaft, an output shaft disposed behind and coaxially with the input shaft, a counter shaft disposed in parallel to both of the input and output shafts, a plurality of gears provided on the input, output and counter shafts to form a plurality of gear trains, a plurality of friction clutch devices each for selectively making and breaking each of power transmitting paths formed among the input, output and counter shafts in relation to the gear trains, and a one-way clutch provided between one of the gears and the input shaft. The power transmitting paths include a first power transmitting path formed through a first gear train including a first gear provided on the input shaft and a second gear provided on the counter shaft to be meshed with the first gear, a second power transmitting path formed through a second gear train including a third gear provided through the one-way clutch device on the rear end of the input shaft and a fourth gear provided on the counter shaft to be meshed with the third gear, a third power transmitting path from the input shaft through the one-way clutch device to the output shaft, and a fourth power transmitting path formed by a third gear train including a fifth gear provided on the rear end of the counter shaft and a sixth gear provided on the output shaft to be meshed with the fifth gear. The friction clutch devices include a first friction clutch device operative selectively to make and break the first power transmitting path, a second friction clutch device provided at the front end of the output shaft to be operative selectively to make and break the third power transmitting path, and a third friction clutch device operative selectively to make and break the fourth power transmitting path.

In an embodiment of automatic transmission apparatus according to the present invention taken by way of example, an additional friction clutch device is provided to be operative selectively to make and break the second power transmitting path, and an additional one-way clutch device is also provided for engaging with the sixth gear in the fourth power transmitting path.

Further, in the embodiment, the fourth power transmission path is used for lower speed ranges and the third friction clutch device is arranged to have a diameter larger than those of other friction clutch devices and disposed on the output shaft at a position behind the rear end of the counter shaft.

In another embodiment of automatic transmission apparatus according to the present invention taken by way of example, the input shaft is coupled with the engine output shaft through a dry friction clutch device, and each of the first, second and third friction clutch devices is constituted with a wet friction clutch device.

In such an automatic transmission apparatus according to the present invention, with the first, second and third gear trains each given the gear ratio set appropriately, the selective engagement of each of the first, second and third friction clutch devices provides selectively at least the following power transmitting paths each starting from the input shaft and ending with the output shaft; a first path which may be used for the first speed, for example, and passes through the second gear train, the counter shaft and the third gear train; a second path which may be used for the second speed, for example, and passes through the first gear train, the counter shaft and the third gear train; a third path which may be used for the third speed, for example, and through which the power is transmitted directly to the output shaft from the input shaft without passing through any gear train; and a fourth path which may be used for the fourth speed, for example, and passes through the first gear train, the counter shaft and the second gear train. It is thus possible to obtain four forward speed ranges with the three gear trains.

In the automatic transmission apparatus thus constituted in accordance with the present invention, the gear train arrangement of such a type as including a plurality of gear trains provided on a couple of parallel shafts is employed so as to form at least four forward speed ranges with three gear trains. Accordingly, the whole configuration of the apparatus is made compact compared with previously proposed automatic transmissions possessed of the same number of speed ranges. Further, the switching of the respective speed ranges is achieved with the operation of one friction clutch device, and therefore it is not required to optimize the adjustment of the timing in operation of each of the friction clutch devices by means of complicated control measures. Consequently, with the automatic transmission apparatus according to the present invention, a satisfactory speed range changing operation is carried out with relatively simple control measures without bringing about the changing shock, the racing condition of an engine or the like.

In the embodiment, one of the friction clutch device provided in the power transmission path used for lower speed ranges is arranged to have an increased diameter at the position behind the counter shaft, so that an increased capacity for transmitting power is obtained for the lower speed ranges without increasing each of external dimensions of the apparatus.

Further, in another embodiment, one of the friction clutch device for coupling the input shaft with the engine output shaft, that is, the friction clutch device used for starting a vehicle is constituted with a dry friction clutch device which can be recovered to have an appropriate ability for transmitting power with simple adjustment even if a friction plate provided therein is a little worn away. This results in that the friction clutch device used for starting a vehicle is improved in durability.

The above, and other objects, features and advantages of the present invention will become apparent from the following detailed description which is to be read in conjunction with the accompanying drawings.

DESCRIPTION OF THE PREFERRED EMBODIMENTS

Figure 1:
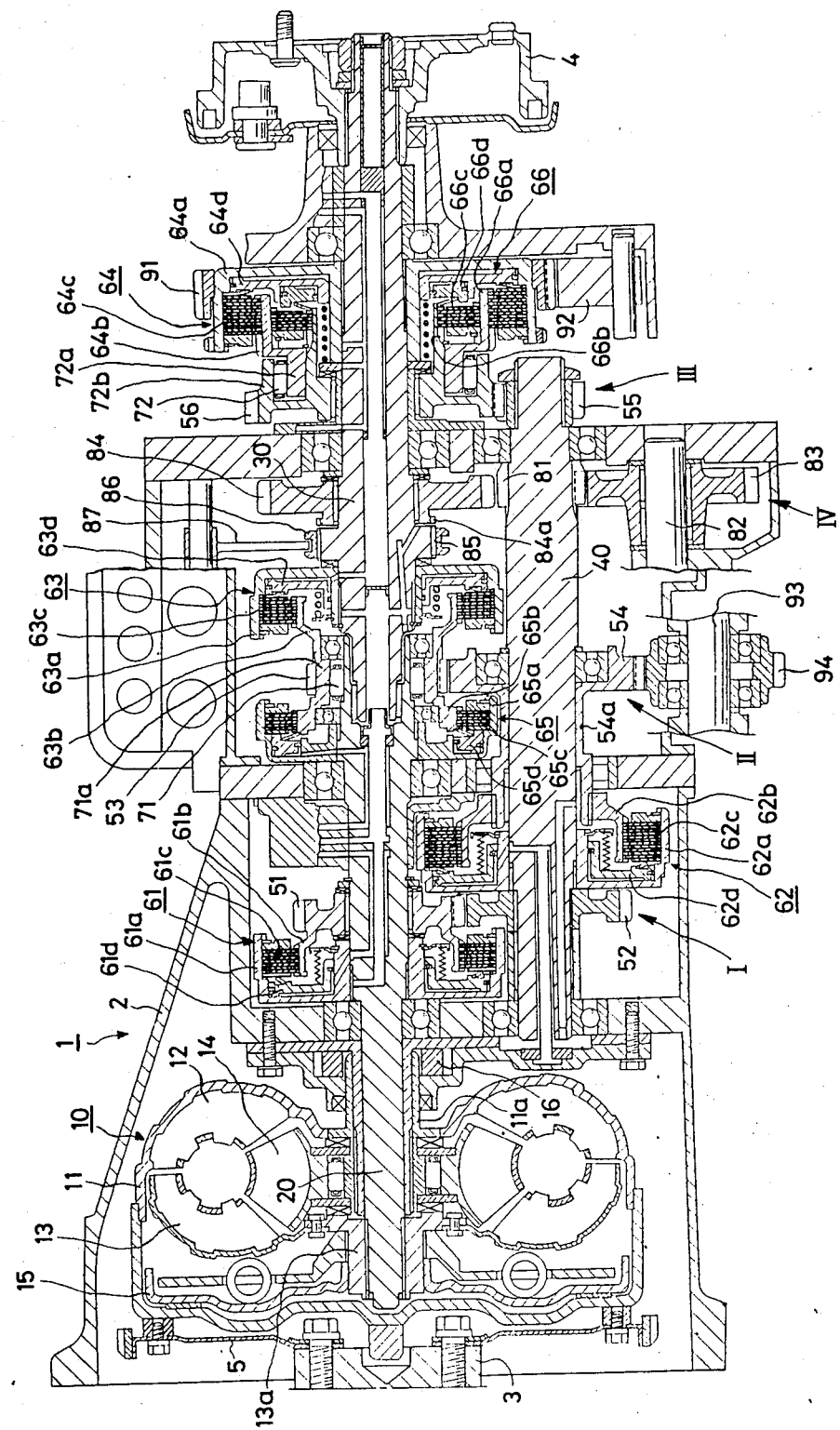
FIG. 1 is a sectional view of an embodiment of automatic transmission apparatus according to the present invention.

FIG. 1 shows an example of the automatic transmission apparatus according to the present invention.

Referring to FIG. 1, an automatic transmission 1, which is one embodiment of automatic transmission apparatus according to the present invention, comprises a torque converter 10 provided in a transmission case 2 to be coupled with an engine output shaft 3, an input shaft 20 connected to the torque converter 10, an output shaft 30 disposed behind and coaxially with the input shaft 20 and having a mounting drum 4 for coupling with a propeller shaft (not shown) at the rear end thereof, a counter shaft 40 disposed in parallel to both the input and output shafts 20 and 30, and a plurality of gear trains, friction clutch devices and one-way clutch devices provided for transmitting or interrupting power between the input, output and counter shafts 20, 30 and 40.

The torque converter 10 includes a pump impeller 12 formed in a body with a case 11 coupled through a driving plate 5 with the engine output shaft 3, a turbine runner 13 disposed to be rotatable, a stator 14 interposed between the pump impeller 12 and the turbine runner 13, and a lock-up clutch device 15 provided between the case 11 and a collar throust bearing 13a connected to the turbine runner 13. The front end of the input shaft 20 is provided with splines to be coupled with the collar thrust bearing 13a, so that the rotation of the turbine runner 13 is transmitted to the input shaft 20. Behind the torque converter 10, an oil pump 16 is provided to be driven by the engine output shaft 3 through the case 11 of the torque converter 10 and a sleeve 11a fixed to the case 11.

A first gear 51 is loosely fitted on the middle portion of the input shaft 20 and a second gear 52 normally meshed with the first gear 51 is fitted on the front portion of the counter shaft 40 through splines provided on the latter. The first and second gears 51 and 52 constitute a first gear train I. A first friction clutch device 61 of a wet multi-plate type is provided on the input shaft 20 for connecting the input shaft 20 with the first gear 51 and disconnecting the input shaft 20 from the first gear 51. The first friction clutch device 61 comprises a drum 61a coupled with the input shaft 20 through splines provided on the latter, a hub 61b formed in a body on the first gear 51, a plurality of friction plates 61c connected alternately with the drum 61a and the hub 61b through splines provided on both of the latter, and a piston 61d for engaging the friction plates 61c together so as to connect the drum 61a with the hub 61b, that is, to connect the input shaft 20 with the first gear 51 when an operating pressure is supplied thereto.

A third gear 53 is also fitted through a first one-way clutch device 71 on the rear end of the input shaft 20 and a fourth gear 54 normally meshed with the third gear 53 is loosely fitted on the counter shaft 40. The third and fourth gears 53 and 54 constitute a second gear train II. A second friction clutch device 62 is provided on the counter shaft 40 for connecting the counter shaft 40 with the fourth gear 54 and disconnecting the counter shaft 40 from the fourth gear 54. The second friction clutch device 62 also comprises a drum 62a coupled with the counter shaft 40 through splines provided on the latter, a hub 62b connected to a sleeve-shaped extension 54a of the fourth gear 54, a plurality of friction plates 62c provided between the drum 62a and the hub 62b, and a piston 62d for engaging the friction plates 62c together so as to connect the drum 62a with the hub 62b, that is, to connect the counter shaft 40 with the fourth gear 54 when an operating pressure is supplied thereto.

Further, a third friction clutch device 63 is provided on the rear end of the input shaft 20 between the first one-way clutch device 71 and the front end of the output shaft 30. This third friction clutch device 63 also comprises a drum 63a coupled with the output shaft 30 through splines provided on the latter, a hub 63b incorporated with an outer race 71a (the third gear 53) of the first one-way clutch device 71, a plurality of friction plates 63c provided between the drum 63a and the hub 63b, and a piston 63d for engaging the friction plates 63c together so as to connect the drum 63a with the hub 63b when an operating pressure is supplied thereto. It is to be noted that when the third friction clutch device 63 is caused to be in engagement and the first one-way clutch device 71 is locked, the input shaft 20 is coupled with the output shaft 30.

On the input shaft 20, a friction clutch device 65 used for engine-braking is provided in a parallel relation to the first one-way clutch device 71. The friction clutch device 65 is composed of a drum 65a connected with the input shaft 20 through splines provided on the latter, a hub 65b incorported with the outer race 71a of the first one-way clutch device 71, a plurality of friction plates 65c provided between the drum 65a and the hub 65b, and a piston 65d for engaging the friction plates 65c together so as to connect the drum 65a with the hub 65b. Accordingly, when the friction clutch device 65 is caused to be in engagement, the input shaft 20 is coupled with the third gear 53 or the hub 63b of the third friction clutch device 63, even if the first oneway clutch device 71 is set free.

A fifth gear 55 is formed in a body on the counter shaft 40 at the rear end thereof and a sixth gear 56 is loosely fitted on the middle portion of the output shaft 30 to be normally meshed with the fifth gear 55. The fifth and sixth gears 55 and 56 constitute a third gear train III. A fourth friction clutch device 64 for connecting the output shaft 30 with the sixth gear 56 and disconnecting the output shaft 30 from the sixth gear 56 and a second one-way clutch device 72 are provided on the output shaft 30 in series along a power transmitting path. The fourth friction clutch device 64 comprises a drum 64a connected with the output shaft 30 through splines provided on the latter, a hub 64b, a plurality of friction plates 64c provided between the drum 64a and the hub 64b, and a piston 64d for engaging the friction plates 64c together so as to connect the drum 64a with the hub 64b when an operating puressure is supplied thereto. The hub 64b is incorporated with an inner race 72a of the second one-way clutch device 72 and an outer race 72b of the second one-way clutch divice 72 is formed in a body on the sixth gear 56. Accordingly, when the fourth friction clutch device 64 is caused to be in engagement and the second one-way clutch device 72 is locked, the sixth gear 56 is engaged with the output shaft 30.

In the inside of the fourth friction clutch device 64, a friction clutch device 66 used for engine-braking is provided concentrically with the fourth friction clutch device 64. This friction clutch device 66 is composed of a drum 66a incorported with the inner race 72a (the hub 64b of the fourth friction clutch device 64), a hub 66b incorporated with the outer race 72a (the sixth gear 56) of the second one-way clutch device 72, a plurality of friction plates 66c provided between the drum 66a and the hub 66b, and a piston 66d for engaging the friction plates 66c together so as to connect the drum 66a with the hub 66b, that is, to connect the inner race 72a of the second one-way clutch device 72 with the outer race 72b of the second one-way clutch device 72. Accordingly, when the friction clutch device 66 and the fourth friction clutch device 64 are caused to be in engagement, respectively, the sixth gear 56 is coupled with the output shaft 30, even if the second one-way clutch device 72 is set free.

The first one-way clutch device 71 is locked to transmit the rotation of the input shaft 20 to the outer race 71a thereof when the speed of the input shaft 20 rotating in a predetermined rotating direction is going to become larger than that of the outer race 71a, and idles when the speed of the outer race 71a rotating exceeds the speed of the input shaft 20. The second one-way clutch device 72 is also locked to transmit the rotation of the outer race 72b thereof to the inner race 72a thereof when the speed of the outer race 72b rotating in a predetermined rotating direction is going to become larger than that of the inner race 72a, and idles when the speed of the inner race 72d rotating exceeds the speed of the outer race 72b.

The diameter of each of the gears 51 to 56 is so arranged that the first gear train I has a gear ratio set at a value about 1, the second gear train II causes reduction in speed when the rotation is transmitted to the fourth gear 54 from the third gear 53, and the third gear train III causes reduction in speed when the rotation is transmitted to the sixth gear 56 from the fifth gear 55.

Further, the fourth friction clutch device 64 is arranged to have a diameter larger than that of any other friction clutch device 61, 62, 63, 65 or 66, and further is disposed at a position behind the rear end of the counter shaft 40 so as not to come into contact with the counter shaft 40.

In addition to the above arrangement, a fourth gear train IV serving as a reversing gear train is provided between the counter shaft 40 and the output shaft 30. The fourth gear train IV comprises a driving gear 81 formed in a body on the cunter shaft 40, an idle gear 83 provided on an idle shaft 82 to be normally meshed with the driving gear 81, and a follower gear 84 loosely fitted on the output shaft 30 to be normally meshed with the idle gear 83. Splines 85 are provided on the output shaft 30 and another splines 84a of the same shape as the splines 85 are provided on the side surface of the follower gear 84 to be adjacent to the splines 85, so that the follower gear 84 is coupled with the output shaft 30 when a sleeve 86 fitted slidably on the splines 85 is shifted by a shifting fork 87 to fit over both of the splines 85 and 84a.

In this embodiment, a parking gear 91 is fixed on the outer periphery of the drum 64a of the fourth friction clutch device 64 and the output shaft 30 is locked through the drum 64a when a parking rod 92 is come into engagement with the parking gear 91. Further, a power supplying gear 94 is provided on a shaft 93 to be meshed with the fourth gear 54 on the counter shaft 40 and power for use in various operations may be derived from the power supplying gear 94.

Now, the power transmitting state at each speed range in the embodiment described above will be explained with reference to Table 1 mentioned below to show conditions of clutch operation and FIGS. 2 to 5 of the accompanying drawings hereinafter. In Table 1, each circular mark:O represents that the friction clutch device is held in engagement to transmit power or the one-way clutch device is locked to transmit power, and each parenthesized circular mark: (O) represents that the friction clutch device is held in engagement without participating in power transmission.

TABLE 1

| Speed range | First friction clutch device 61 | Second friction clutch device 62 | Third friction clutch device 63 | Fourth friction clutch device 64 |
|---|---|---|---|---|
| 1 |   | O |   | O |
| 2 | O | (O) |   | O |
| 3 | (O) |   | O | (O) |
| 4 | O | O | O | (O) |

| Speed range | First one-way clutch device 71 | Second one-way clutch device 72 | Friction clutch devices for engine-braking | |
|---|---|---|---|---|
| | | | 65 | 66 |
| 1 | O | O | O | O |
| 2 |   | O |   | O |
| 3 | O |   | O |   |
| 4 | | | | |

First, in the case of the first speed range, the second and fourth friction clutch devices 62 and 64 are held in engagement, and the first and second one-way clutch devices 71 and 72 are locked, as shown in Table 1. At this time, as indicated with portions hatched with solid lines in FIG. 2, the rotation of the engine output shaft 3, which corresponds to the output power of the engine, is transmitted from the input shaft 20 through the first one-way clutch device 71 to the third gear 53 of the second gear train II, and further transmitted from the third gear 53 through the fourth gear 54 and the second friction clutch device 62 to the counter shaft 40. Then, the rotation delivered to the counter shaft 40 is transmitted furthermore through the fifth and sixth gears 55 and 56 constituting the third gear train III, the second one-way clutch device 72 and the fourth friction clutch device 64 to the output shaft 30. In such a transmitting path, the rotation of the input shaft 20 is decelerated in the second gear train II before being transmitted to the counter shaft 40, and then, the rotation delivered to the counter shaft 40 is further decelerated in the third gear train III before being transmitted to the output shaft 30. Consequently, the greatest speed reducing ratio for the first speed range is obtained.

Figure 3:
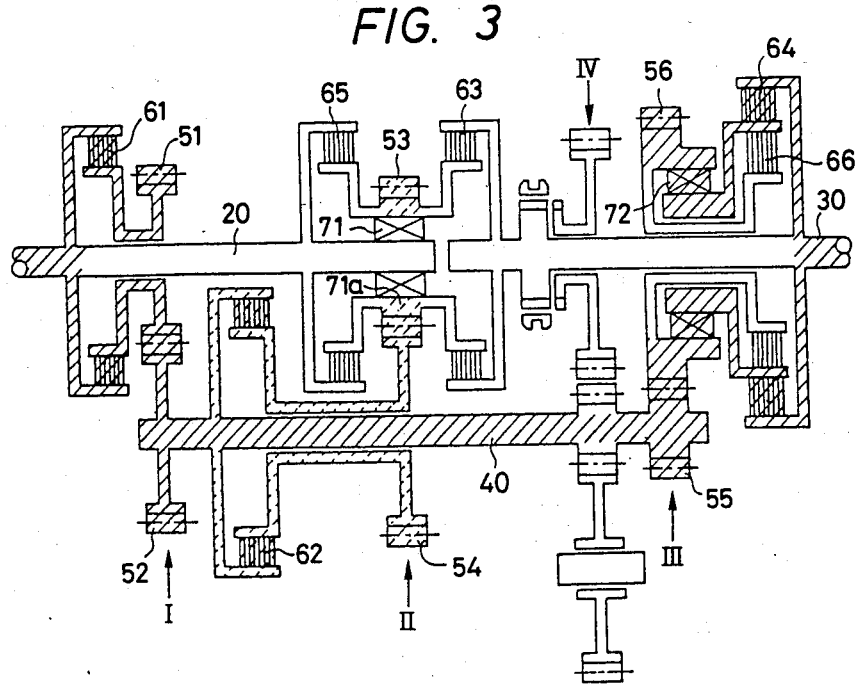

In the case of the second speed range, the first friction clutch device 61 is held in engagement in addition to the condition of the first speed range, as shown in Table 1. At this time, as shown in FIG. 3, the rotation of the input shaft 20 is transmitted through the first friction clutch device 61, the first and second gears 51 and 52 constituting the first gear train I to the counter shaft 40, and further transmitted from the counter shaft 40 through the fifth and sixth gears 55 and 56 constituting the third gear train III, the second one-way clutch device 72 and the fourth friction clutch device 64 to the output shaft 30 in the same manner as the case of the first speed range. In such a transmitting path, since the speed reducing ratio of the first gear train I is set to be about 1 and smaller than that of the second gear train II, a speed reducing ratio for the second speed range which is smaller than that for the first speed range is obtained.

In this case, the change to the second speed range from the first speed range is effected by only the engaging action of the first friction clutch device 61 and the second friction clutch device 62 remains in the engaging state, and therefore, as indicated with portions hatched with broken lines in FIG. 3, the rotation delivered to the counter shaft 40 is transmitted through the second friction clutch device 62 to the fourth gear 54 and the third gear 53. However, since the first oneway clutch device 71 provided between the third gear 53 and the input shaft 20 idles with the outer race 71a rotating at the speed higher than that of the input shaft 20, the power delivered to the input shaft 20 can not be transmitted through the second gear train II to the counter shaft 40. The second friction clutch device 62 is disengaged appropriately in the state of the second speed range.

Figure 4:
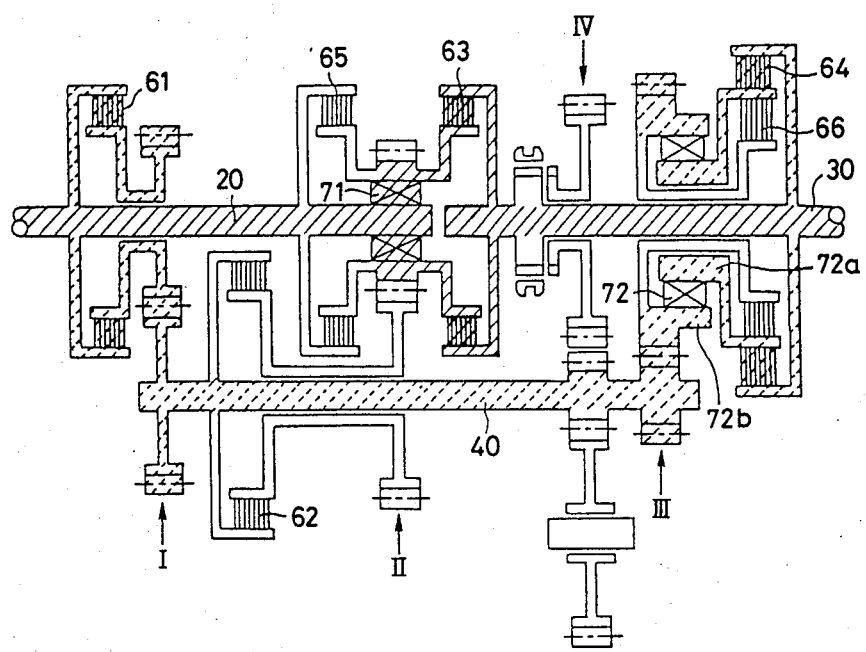

In the case of the third speed range, the third friction clutch device 63 is held in engagement in addition to the condition of the second speed range wherein the second friction clutch device 62 has been already disengaged, as shown in Table 1. At this time, as shown in FIG. 4, the rotation of the input shaft 20 is transmitted through the first one-way clutch device 71 and the third friction clutch device 63 to the output shaft 30. The transmitting path thus formed does not include any gear train, and therefore the rotation of the input shaft 20 is transmitted to the output shaft 30 without being reduced, so that a so-called directly coupled state is obtained.

During the state of the third speed range, the first and fourth friction clutch devices 61 and 64 are held in engagement. Accordingly, as indicated with portions hatched with broken lines in FIG. 4, the rotation of the input shaft 20 is transmitted through the first friction clutch device 61, the first gear train I, the counter shaft 40 and the third gear train III to the outer race 72b of the second one-way clutch device 72, and the rotation of the output shaft 30 is also transmitted through the fourth friction clutch device 64 to the inner race 72a of the second one-way clutch device 72. However, since the second one-way clutch device 72 idles with the inner race 72a rotating at the speed higher than that of the outer race 72b, the rotation of the counter shaft 40 does not exert any harmful influence upon the rotation of the output shaft 30.

Figure 5:
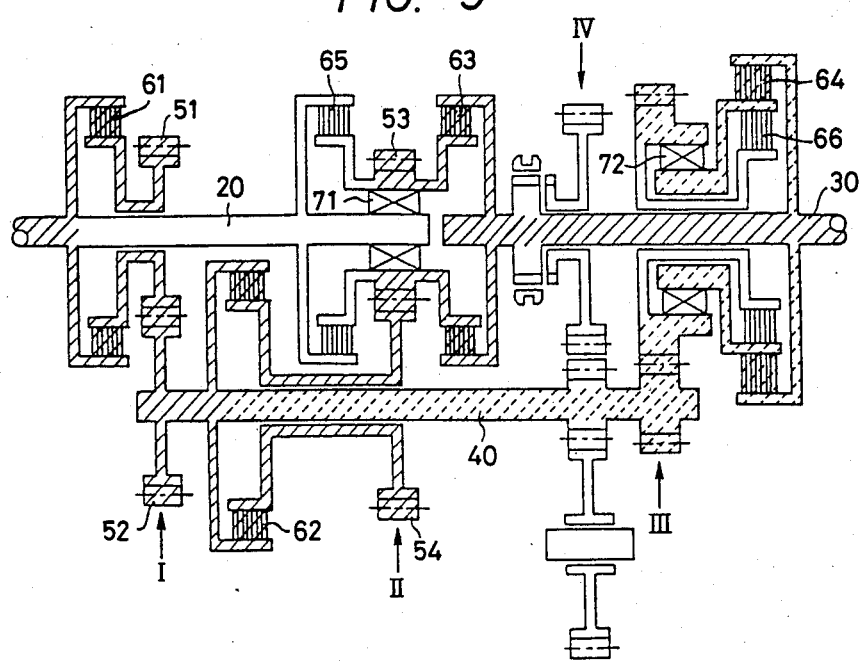

Further, in the case of the fourth speed range, the second friction clutch device 62 is additionally held in engagement, so that all of the first to fourth friction clutch devices 61 to 64 are held in engagement, as shown in Table 1. At this time, as shown in FIG. 5, the rotation of the input shaft 20 is transmitted through the first friction clutch device 61 and the first and second gears 51 and 52 to the counter shaft 40, and further transmitted from the counter shaft 40 through the second friction clutch device 62, the fourth and third gears 54 and 53 constituting the second gear thain II and the third friction clutch device 63 to the output shaft 30. In such a transmitting path, the rotation is transmitted from the counter shaft 40 to the output shaft 30 through the second gear train II wherein the rotation of the fourth gear 54 is transmitted to the third gear 53 which has a diameter smaller than that of the fourth gear 54 and therefore the rotation of the third gear 53 is increased compared with the rotation of the fourth gear 54. Consequently, a so-called overdrive state for the fourth speed range is established. The first one-way clutch device 71 idles in the same manner as the case of the second speed range and the second one-way clutch device 72 also idles in the same manner as the case of the third speed range.

In such a manner as described above, three gear trains I to III juxtaposed between two of the input, output and counter shafts 20, 30 and 40 are selectively brought into the power transmitting state in accordance with the operation of each of the first to fourth friction clutch devices 61 to 64 and the first and second one-way clutch devices 71 and 72, so as to provide four forward speed ranges. Each of changes to the second speed range from the first speed range, to the third speed range from the second speed range, to the fourth speed range from the third speed range is effected by only the operation of one of the first to fourth friction clutch devices 61 to 64.

During the state of the first speed range and the state of the second speed range, the first one-way clutch device 71 is locked to transmit power, and during the state of the third speed range and the state of the fourth speed range, the second one-way clutch device 72 is locked to transmit power. However, when a vehicle to which the embodiment is applied is coasting, each of the first and second one-way clutch devices 71 and 72 idles over, so that the automatic transmission 1 is caused to be in a neutral state. In the case where it is required to effect engine-braking in a situation in which the vehicle is coasting, the friction clutch devices 65 and 66 for engine-braking are caused to be in engagement, as shown in Table 1, so as to transmit power in place of the first and second one-way clutch devices 71 and 72. With such power transmission through the friction clutch devices 65 and 66, an engine-braking state is obtained in the situation in which the vehicle is coasting.

Further, in the case of a reverse speed range, the first one-way clutch device 71 is locked, the second friction clutch device 62 is held in engagement, and the follower gear 84 is coupled through the sleeve 86 to the output shaft 30. Accordingly, the rotation of the input shaft 20 is transmitted through the first one-way clutch device 71, the second gear train II, the second friction clutch device 62, the counter shaft 40 and the fourth gear train IV to the output shaft 30. In such a transmitting path, the fourth gear train IV is provided with the idle gear 83 and therefore the direction of rotation of the output shaft 30 is reversed.

In the embodiment mentioned above, the fourth friction clutch device 64 for constituting the transmitting path for the lower speed ranges, that is, the first and second speed ranges is arranged to have an increased diameter at the position behind the counter shaft 40. This results in that an increased capacity for transmitting power is obtained for the lower speed ranges without increasing the size of the automatic transmission 1.

Figure 6:
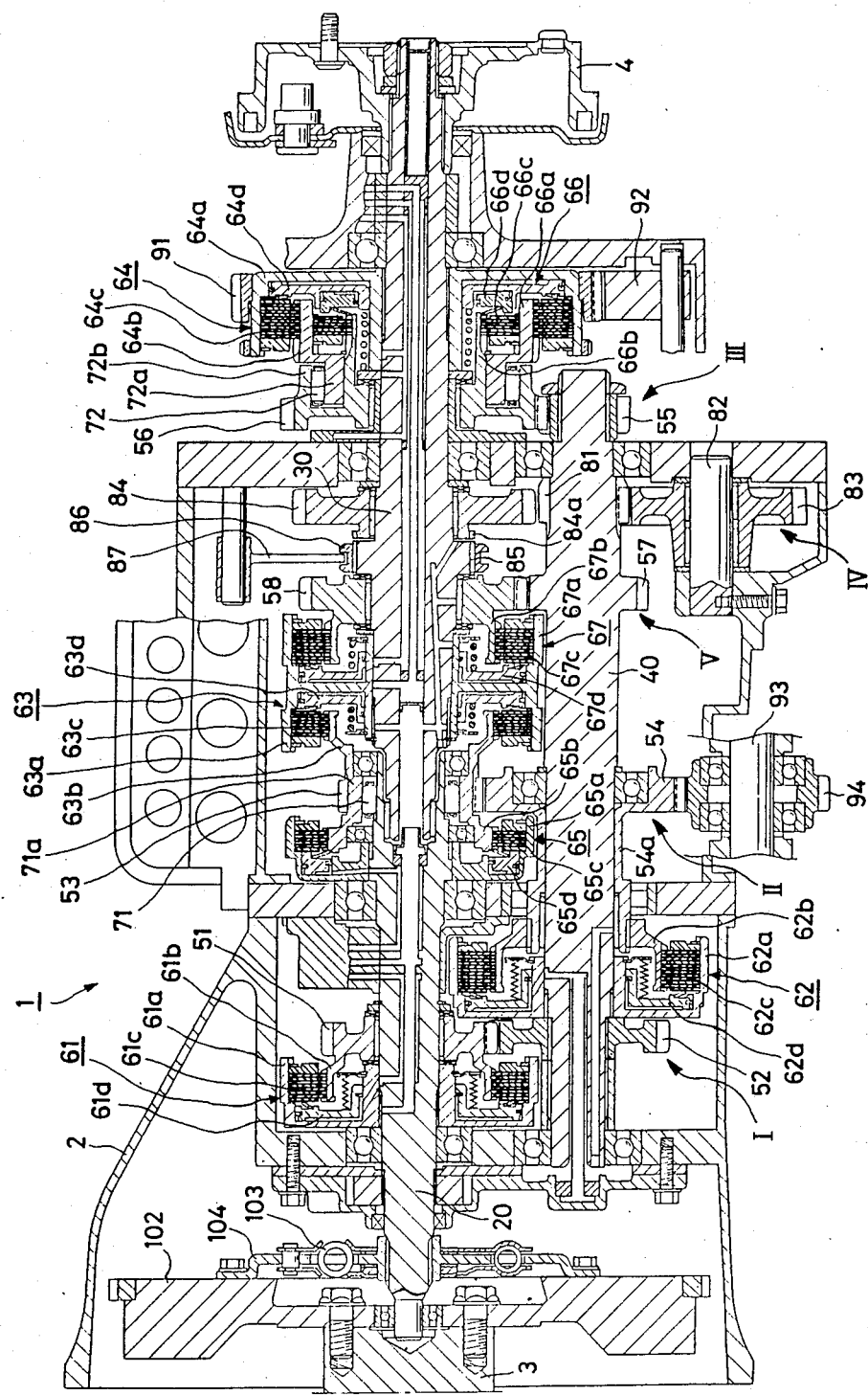
FIG. 6 is a sectional view of another embodiment of automatic transmission apparatus according to the present invention.
Figure 7:
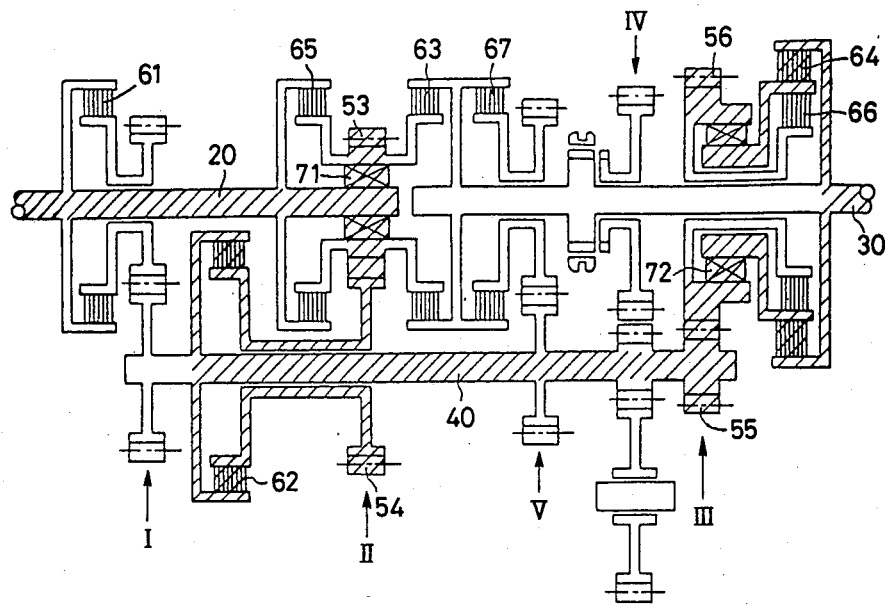
FIGS. 7 to 12 are illustrations used for explaining power transmitting paths for the respective speed ranges in the embodiment shown in FIG. 6.

FIG. 6 shows another example of the automatic transmission apparatus according to the present invention. In FIG. 6, elements, devices and parts corresponding to those of FIG. 1 are marked with the same references and further description thereof will be omitted.

Referring to FIG. 6, in the automatic transmission 1 which is another embodiment of automatic transmission apparatus according to the present invention, the front end of the input shaft 20 is coupled to the engine outout shaft 3 through a buffer disc 104 with a torsion spring 103 for moderating shocks inflicted on the occasion of the change of speed range and a flywheel 102 fixed to the end of the engine output shaft 3.

Further, in the embodiment shown in FIG. 6, in addition to the arrangement of gears and clutch devices in the embodiment of FIG. 6, a seventh gear 57 formed in a body on the rear portion of the counter shaft 40 is provided, and a eighth gear 58 is loosely fitted on the output shaft 30 to be normally meshed with the seventh gear 57. The seventh and eighth gears 57 and 58 thus provided constitute a fifth gear train V. The diameter of each of the seventh and eighth gears 57 and 58 is so arranged that the fifth gear train V causes reduction in speed with a speed reducing ratio smaller than that of the third gear train III.

Besides, a fifth friction clutch device 67 is provided at a position just behind the third friction clutch device 63 on the output shaft 30 for connecting the eighth gear 58 with the output shaft 30 and disconnecting the eighth gear 58 from the output shaft 30. This fifth friction clutch device 67 comprises a drum 67a incorporated with the drum 63a of the third friction clutch device 63 to be coupled with the output shaft 30 through splines provided on the latter, a hub 67b incorporated with the seventh gear 57, a plurality of friction plates 67c provided between the drum 67a and the hub 67b, and a piston 67d for engaging the friction plates 67c together so as to connect the drum 67a with the hub 67b, that is, to connect the eighth gear 58 with the output shaft 30 when an operating pressure is supplied thereto.

Then, the power transmitting state at each speed range in the embodiment of FIG. 6 will be described with reference to Table 2 mentioned below to show conditions of clutch operation and FIGS. 7 to 12 of the accompanying drawings hereinafter. In Table 2, each circular mark:O represents that the friction clutch device is held in engagement to transmit power or the one-way clutch device is locked to transmit power, and each parenthesized circular mark: (O) represents that the friction clutch device is held in engagement without participating in power transmission.

TABLE 2

| Speed range | First friction clutch device 61 | Second friction clutch device 62 | Third friction clutch device 63 | Fifth friction clutch device 67 | Fourth friction clutch device 64 |
|---|---|---|---|---|---|
| 1 |   | O |   |   | O |
| 2 | O | (O) |   |   | O |
| 3 |   | O |   | O | (O) |
| 4 | O | (O) |   | O | (O) |
| 5 | (O) |   | O |   | (O) |
| 6 | O | O | O | O |   |

| Speed range | First one-way clutch device 71 | Second one-way clutch device 72 | Friction clutch devices for engine-braking | |
|---|---|---|---|---|
|   |   |   | 65 | 66 |
| 1 | O | O | O | O |
| 2 |   | O |   | O |
| 3 | O |   | O |   |
| 4 |   |   |   |   |
| 5 | O |   | O |   |
| 6 |   |   |   |   |

Figure 2:
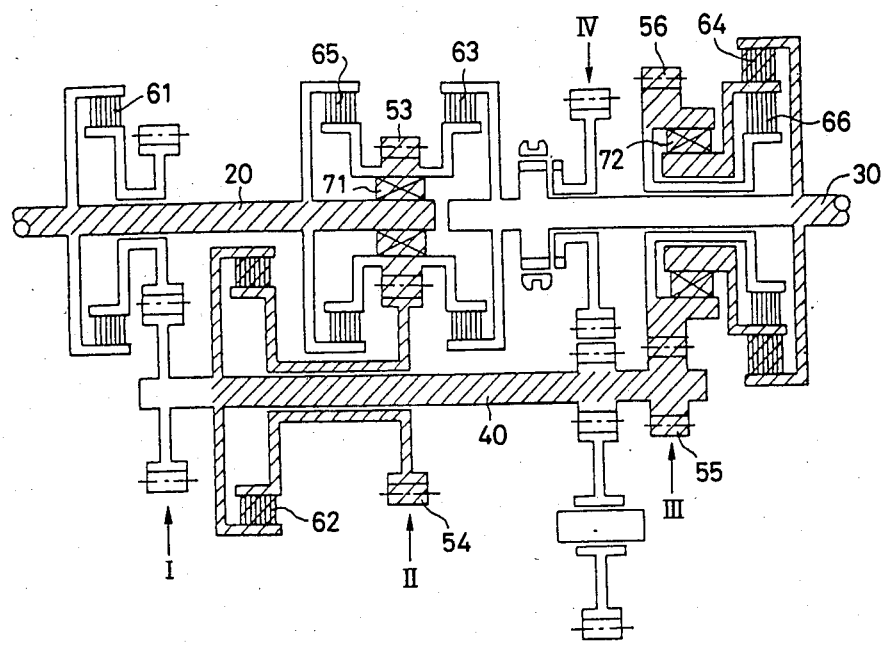
FIGS. 2 to 5 are illustrations used for explaining power transmitting paths for the respective speed ranges in the embodiment shown in FIG. 1.

First, in the case of the first speed range, the second and fourth friction clutch devices 62 and 64 are held in engagement, and the first and second one-way clutch devices 71 and 72 are locked, as show in Table 2. At this time, as indicated with portions hatched with solid lines in FIG. 7, a transmitting path which is the same as the transmitting path constituted for the first speed range in the embodiment of FIG. 1 and shown in FIG. 2 is made up, and the greatest speed reducing ratio for the first speed range is obtained through the second and third gear trains II and III.

Figure 8:
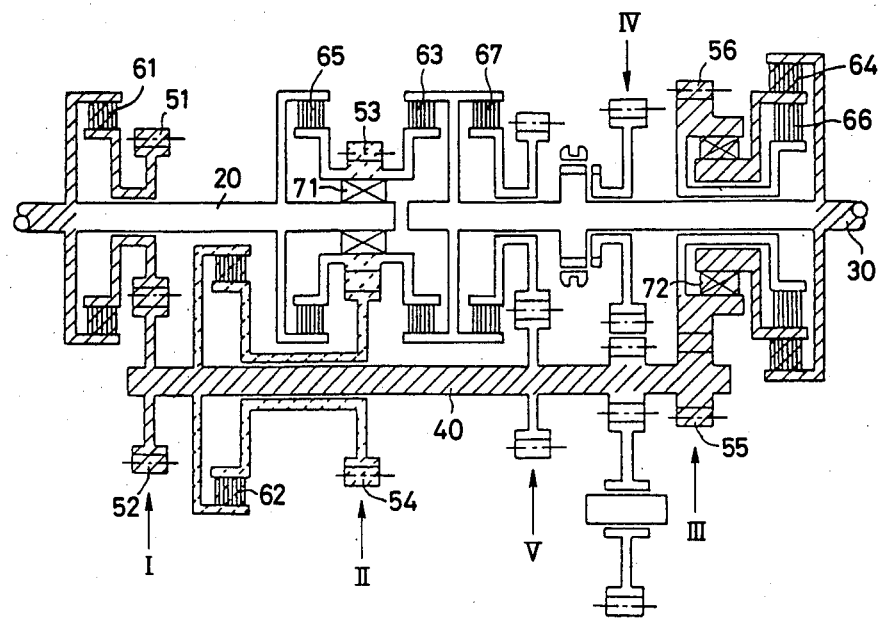

In the case of the second speed range, the first friction clutch device 61 is held in engagement in addition to the condition of the first speed, as shown in Table 2. At this time also, as shown in FIG. 8, a transmitting path which is the same as the transmitting path constituted for the second speed range in the aforementioned embodiment of FIG. 1 and shown in FIG. 3 is made up, and a speed reducing ratio for the second speed range which is smaller than that for the first speed range is obtained through the first and third gear trains I and III.

Figure 9:
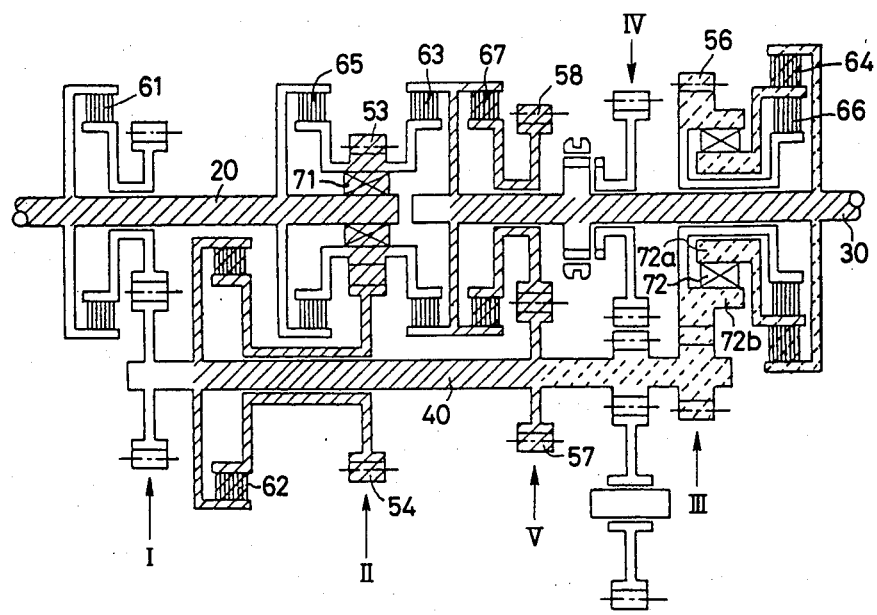

In the case of the third speed range, the first friction clutch device 61 is released and the second and fifth friction clutch devices 62 and 67 are held in engagement, as shown in Table 2. Accordingly, as shown in FIG. 9, the rotation of the input shaft 20 is transmitted through the first one-way clutch device 71, the second gear train II and the second friction clutch device 62 to the counter shaft 40 in the same manner as the case of the first speed range, and further transmitted from the counter shaft 40 through the seventh and eighth gears 57 and 58 constituting the fifth gear train V and the fifth friction clutch device 67 to the output shaft 30. In such a transmitting path, since the total speed reducing ratio obtained through the second and fifth gear trains II and V is smaller than that obtained through the first and third gear trains I and III, a speed reducing ratio for the third speed range which is smaller than that for the second speed range is obtained.

During the state of the third speed range, as indicated with portions hatched with broken lines in FIG. 9, the rotation of input shaft 20 is transmitted through the third gear train III to the outer race 72b of the second one-way clutch device 72, and the rotation of the output shaft 30 is also transmitted through the fourth friction clutch device 64 to the inner race 72a of the second one-way clutch device 72. However, since the second one-way clutch device 72 idles with the inner race 72a rotating at speed higher than that of the outer race 72b, the rotation of the counter shaft 40 does not exert any harmful influence upon the rotation of the output shaft 30.

Figure 10:
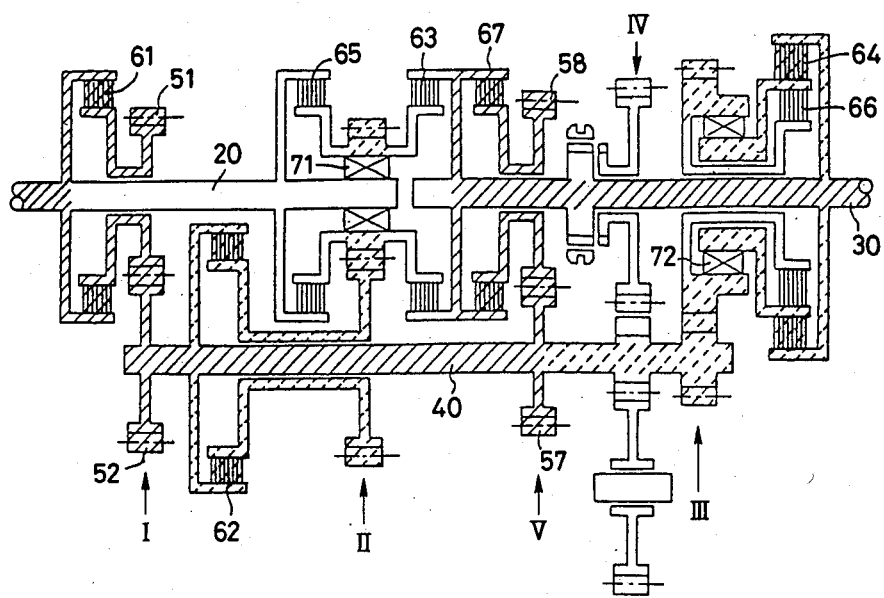

In the case of the fourth speed range, the first friction clutch device 61 is held in engagement in addition to the condition of the third speed range, as shown in Table 2. At this time, as shown in FIG. 10, the rotation of the input shaft 20 is transmitted through the first friction clutch device 61 and the first and second gears 51 and 52 constituting the first gear train I to the counter shaft 40, and further transmitted from the counter shaft 40 through the seventh and eighth gears 57 and 58 constituting the fifth gear train V and the fifth friction clutch device 67 to the output shaft 30. In such a transmitting path, the rotation of the input shaft 20 is transmitted to the counter shaft 40 through the first gear train I having the speed reducing ratio smaller than that of the second gear train II which is used in the state of third speed range, so that a speed reducing ratio for the fourth speed range which is smaller than that for the third speed range is obtained.

In this case, although the second and fourth friction clutch devices 62 and 64 are held in engagement, the first one-way clutch device 71 idles in the same manner as the case of the second speed range and the second one-way clutch device 72 also idles in the same manner as the case of the third speed range, and therefore the power can not be transmitted through the first or second one-way clutch device 71 or 72. Further, the second friction clutch device 62 is released appropriately in the state of the fourth speed range.

Figure 11:
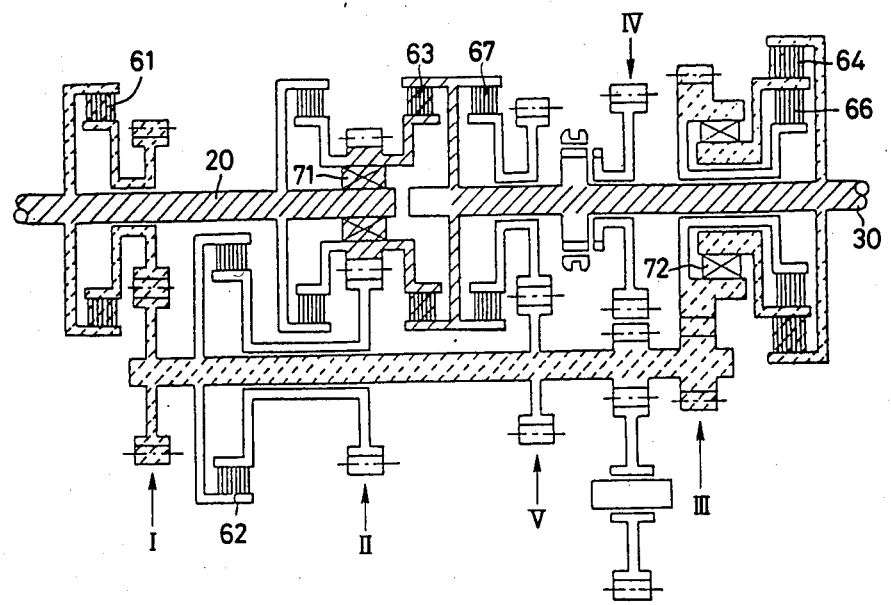

In the case of the fifth speed range, the first, third and fourth friction clutch devices 61, 63 and 64 are held in engagement and the second and fifth friction clutch devices 62 and 67 are released, as shown in Table 2. At this time, as shown in FIG. 11, a transmitting path which is the same as the transmitting path constituted for the third speed range in the aforementioned embodiment of FIG. 1 and shown in FIG. 4 is made up, and a so-called directly coupled state is obtained.

Figure 12:
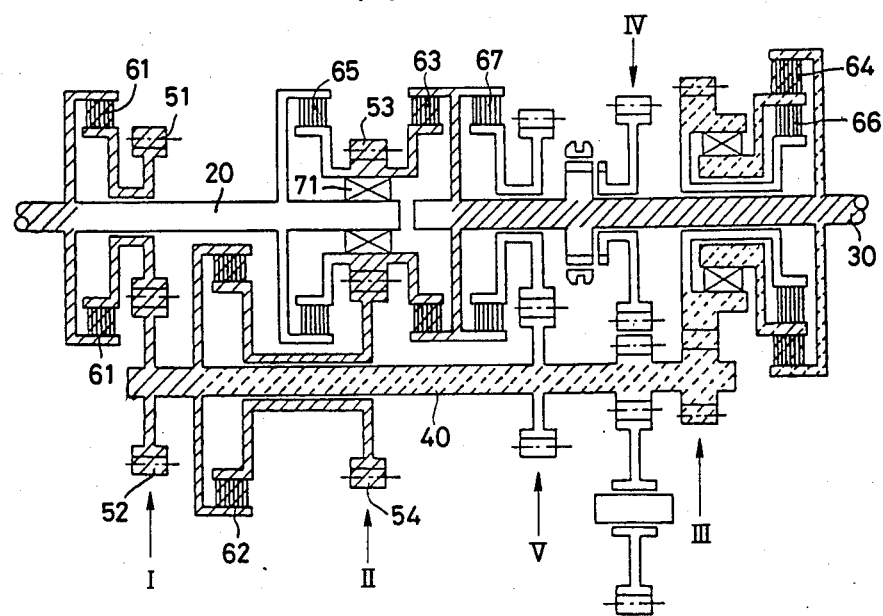

Further, in the case of the sixth speed range, the second friction clutch device 62 is held in engagement in addition to the condition of the fifth speed range, as shown in Table 2. In this case, as shown in FIG. 12, a transmitting path which is the same as the transmitting path constituted for the fourth speed range in the aforementioned embodiment of FIG. 1 and shown in FIG. 5 is made up, and a so-called overdrive state for the sixth speed range is obtained in the same manner as the case of the fourth speed range in the embodiment of FIG. 1.

In such a manner as described above, four gear trains I to III and V juxtaposed between two of the input, output and counter shafts 20, 30 and 40 are selectively brought into the power transmitting state in accordance with the operation of each of the first to fifth friction clutch devices 61 to 64 and 67 and the first and second one-way clutch devices 71 and 72, so as to provide six forward speed ranges. Each of changes to the second speed range from the first speed range, to the fourth speed range from the third speed range, and to the sixth speed range from the fifth speed range is effected by only the operation of one of the first to fifth friction clutch devices 61 to 64 and 67, and each of the changes to the third speed range from the second speed range and to the fifth speed range from the fourth speed range is effected by only the operations of two of the first to fifth friction clutch devices 61 to 64 and 67.

The first one-way clutch device 71 is locked to transmit power during the state of the first speed range, the state of the third speed range and the state of the fifth speed range, and the second one-way clutch device 72 is locked to transmit power during the state of the first speed range and the state of the second speed range. However, when a vehicle to which the embodiment shown in FIG. 6 is applied is coasting, each of the first and second one-way clutch devices 71 and 72 idles over, so that the automatic transmission 1 is caused to be in a neutral state. In the case where it is required to effect engine-braking in a situation in which the vehicle is coasting, the friction clutch devices 65 and 66 for engine-braking are caused to be in engagement, as shown in Table 2, so as to transmit power in place of the first and second one-way clutch devices 71 and 72. With such power transmission through the friction clutch devices 65 and 66, the engine-braking state is obtained in the situation in which the vehicle is coasting.

Further, in the case of the reverse speed range, a transmitting path which is the same as the transmitting path constituted for the reverse speed range in the aforementioned embodiment of FIG. 1 is made up.

Figure 13:
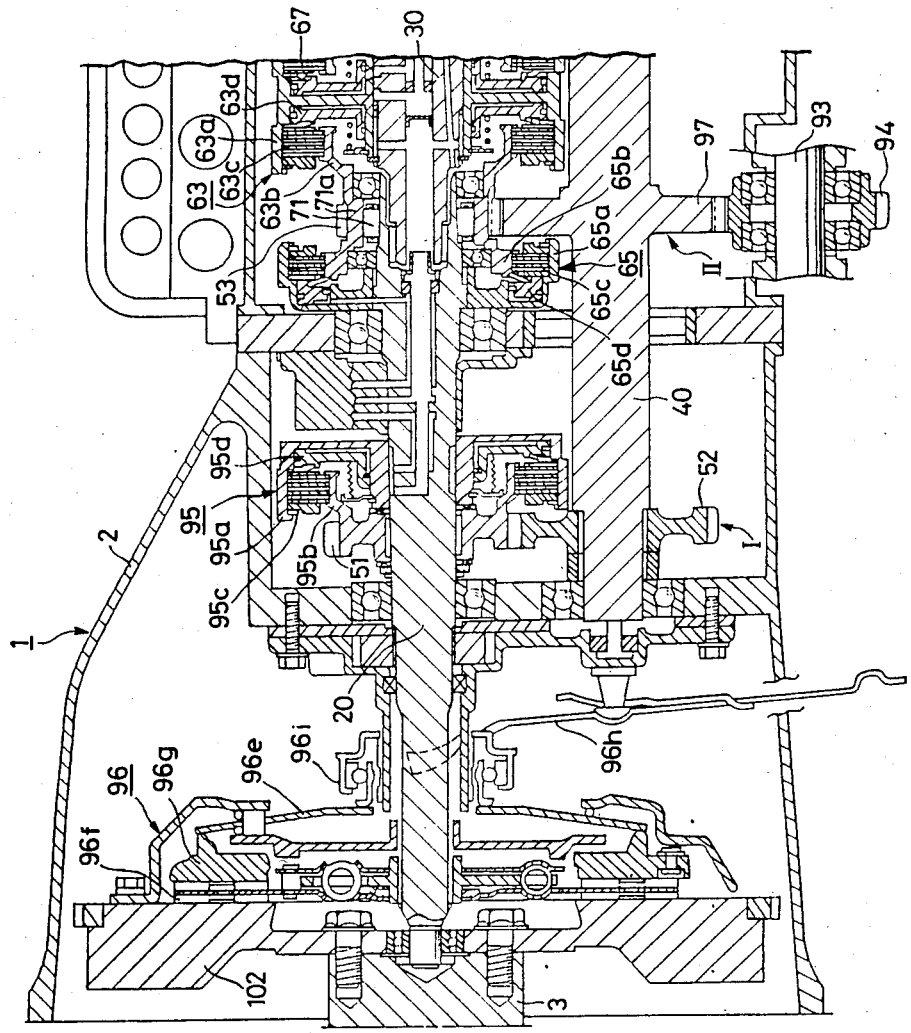
FIG. 13 is a sectional view of a portion of a further embodiment of automatic transmission apparatus according to the present invention.

FIG. 13 shows a portion of a further example of the automatic transmission apparatus according to the present invention. In FIG. 6, elements, devices and parts corresponding to those of FIG. 6 are marked with the same references and further description thereof will be omitted.

In the embodiment shown in FIG. 13, the front end of the input shaft 20 is coupled to the engine output shaft 3 through a firction clutch device 96 of a dry type and the flywheel 102 fixed to the end of the engine output shaft 3, and a friction clutch device 95 of a wet multi-plate type is provided on the input shaft 20 for connecting the first gear 51 with the input shaft 20 and disconnecting the first gear 51 from the input shaft 20 in place of the first friction clutch device 61 employed in the embodiment shown in FIG. 6. Further, a gear 97 is formed in a body on the counter shaft 40 in place of the arrangement comprising the fourth gear 54 and the second friction clutch device 62 which is employed in the embodiment shown in FIG. 6. The gear 97 is meshed with the third gear 53 so as to constitute the second gear train II together with the third gear 53. The remaining portions are constructed in the same manner as the embodiment shown in FIG. 6.

The friction clutch device 96 of a dry type has a diaphragm spring 96e, a pressure plate 96g engaged with the diaphragm spring 96e, a friction plate 96f provided on the input shaft 20 to be disposed between the pressure plate 96g and the flywheel 102, and a release thrust bearing 96i provided movably on the input shaft 20 at the back of the diaphragm spring 96e. When the friction plate 96f is pressed against the flywheel 102 by the pressure plate 96g forced by the diaphragm spring 96e, the rotation of the engine output shaft 3 is transmitted through the flywheel 102 and the friction plate 96f to the input shaft 20. On the other hand, when the release thrust bearing 96i is shifted toward the flywheel 102 along the input shaft 20 by a release lever 96h automatically controlled through a hydraulic actuator (not shown), the pressure plate 96g is released from the action of the diaphragm spring 96e so that the rotation of the engine output shaft 3 is prevented from being transmitted to the input shaft 20.

The friction clutch device 95 comprises a drum 95a coupled with the input shaft 20 through splines provided on the latter, a hub 95b incorporated with the first gear 51, a plurality of friction plates 95c provided between the drum 95a and the hub 95b to be connected alternately to the drum 95a and the hub 95b, respectively, and a piston 95d for engaging the friction plates 95c together so as to connect the drum 95a with the hub 96b, that is, to connect the first gear 51 with the input shaft 20 when an operating pressure is supplied thereto.

With the configuration thus constituted, in the case of the first speed range, the friction clutch device 96 and the fourth friction clutch device 64, which is provided in the same manner as that in the embodiment of FIG. 6 though it is not shown in FIG. 13, are held in engagement and the first one-way clutch device 71 is locked. At this time, as indicated with portions hatched with solid lines in FIG. 14, the rotation of the engine output shaft 3 is transmitted through the friction clutch device 96 to the input shaft 20, and further transmitted from the input shaft 20 through the first one-way clutch device 71, the second gear train II formed with the third gear 53 and the gear 97 to the counter shaft 40. Then, the rotation delivered to the counter shaft 40 is transmitted furthermore to the output shaft 30 in the same manner as that transmitted in the state of the first speed range in the embodiment of FIG. 6. In such a transmitting path, the greatest speed reducing ratio for the first speed range is obtained in such a manner as aforementioned in connection with the embodiment of FIG. 6.

Figure 15:
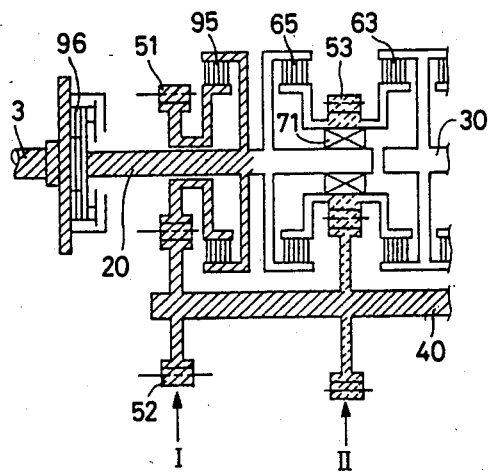

In the case of the second speed range, the friction clutch device 95 is held in engagement in addition to the condition of the first speed. Accordingly, as shown in FIG. 15, the rotation delivered to the input shaft 20 through the friction clutch device 96 is transmitted through the friction clutch device 95 and the first and second gears 51 and 52 constituting the first gear train I to the counter shaft 40. Then, the rotation delivered to the counter shaft 40 is further transmitted to the output shaft 30 in the same manner as that transmitted in the state of the second speed range in the embodiment of FIG. 6. In this transmitting path, since the speed reducing ratio of the first gear train I is smaller than that of the second gear train II used for the first speed range, a speed reducing ratio for the second speed range which is smaller than that for the first speed range is obtained.

In this case, the change to the second speed range from the first speed range is effected by only the engaging action of the friction clutch device 95, and the rotation delivered to the counter shaft 40 is transmitted to the gear 97 and the third gear 53, as indicated with portions hatched with broken lines in FIG. 15. However, since the first one-way clutch device 71 idles with the outer race 71a rotating at the speed higher than that of the input shaft 20, the rotation delivered to the input shaft 20 can not be transmitted through. the second gear train II to the counter shaft 40.

Figure 14:
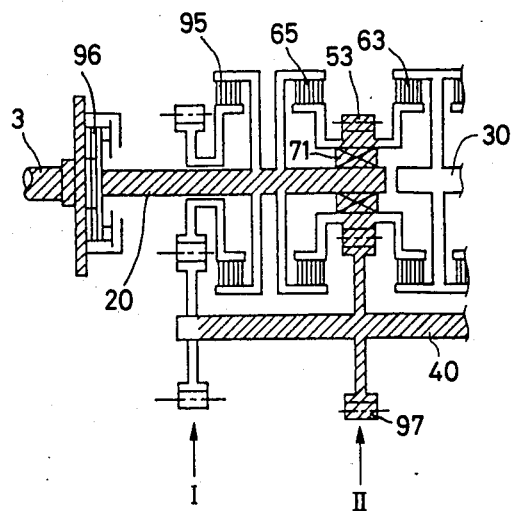
FIGS. 14 to 17 are illustrations used for explaining power transmitting paths for the respective speed ranges in the embodiment shown in FIG. 13.

In the case of the third speed range, the friction clutch devices 96 and 95, the third friction clutch device 63 and the first one way clutch device 71 are set in the same manner as those in the state of the first speed range shown in FIG. 14. With such an arrangement, a speed reducing ratio for the third speed range which is smaller than that for the second speed range is obtained in such a manner as aforementioned in connection with the third speed range in the embodiment of FIG. 6.

In the case of the fourth speed range, the friction clutch devices 96 and 95, the third friction clutch device 63 and the first one-way clutch device 71 are set in the same manner as those in the state of the second speed range shown in FIG. 15. With such an arrangement, a speed reducing ratio for the fourth speed range which is smaller than that for the third speed range is obtained in such a manner as aforementioned in connection with the fourth speed range in the embodiment of FIG. 6. In this case also, the rotation delivered to the counter shaft 40 is transmitted to the gear 97 and the third gear 53 to the outer race 71a of the first one-way clutch device 71. However, since the first one-way clutch device 71 idles with the outer race 71a rotating at the speed higher than that of the input shaft 20, the rotation of the outer race 71a does not exert any harmful influence upon the rotation of the input shaft 20.

Figure 16:
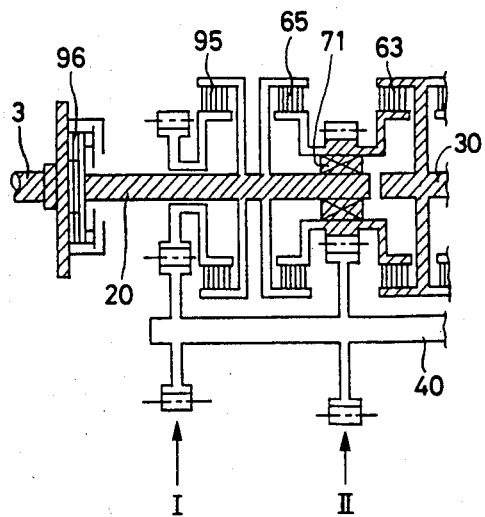

In the case of the fifth speed range, the friction clutch device 96 and the third and fourth friction clutch devices 63 and 64 are held in engagement, the friction clutch device 95 and the fifth friction clutch device 67, which is provided in the same manner as that in the embodiment of FIG. 6 though it is not shown in FIG. 13, are released, and the first one-way clutch device 71 is locked. Accordingly, as shown in FIG. 16, the rotation of the input shaft 20 is transmitted through the first one-way clutch device 71 and the third friction clutch device 63 to the output shaft 30. This transmitting path does not include any gear train and therefore the directly coupled state is obtained.

During the state of the fifth speed range, the fourth friction clutch device 64 is held in engagement, and the rotation delivered to the output shaft 30 is transmitted through the fourth friction clutch device 64 to the inner race 72a of the second one-way clutch device 72 which is provided in the same manner as that in the embodiment of FIG. 6 though it is not shown in FIG. 13. However, since the second one-way clutch device 72 idles with the inner race 72a rotating at the speed higher than that of the outer race 72b, the rotation of the inner race 72a does not exert any harmful influence upon the rotation of the output shaft 30.

Figure 17:
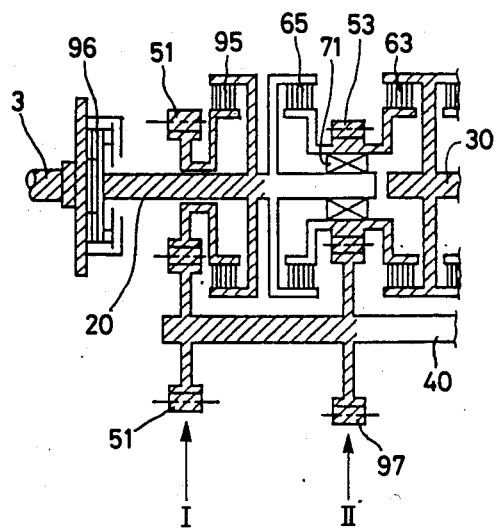

Further, in the case of the sixth speed range, the friction clutch device 95 is held in engagement in addition to the condition of the fifth speed range. Accordingly, as shown in FIG. 17, the rotation of the input shaft 20 is transmitted through the friction the friction clutch device 95 and the first and second gears 51 and 52 constituting the first gear train I to the counter shaft 40, and further transmitted from the counter shaft 40 through the gear 97 and the third gear 53 constituting the second gear train II and the third friction clutch device 63 to the output shaft 30. In such a transmitting path, the rotation is transmitted from the counter shaft 40 to the output shaft 30 through the second gear train II wherein the rotation of the gear 97 is transmitted to the third gear 53 which has a diameter smaller than that of the gear 97 and therefore the rotation of the third gear 53 is increased compared with the rotation of the gear 97. Consequently, the overdrive state for the six speed range is established. The first and second one-way clutch devices 71 and 72 idle over, respectively.

In such a manner as described above, each of six forward speed ranges is provided selectively with for gear trains I to III and V, six friction clutch devices 61, 63, 64, 67, 95 and 96 and the two one-way clutch devices 71 and 72.

In this embodiment shown in FIG. 13, the friction clutch device 96 which transmits therethrough a relatively large torque for starting a vehicle employing the embodiment is constituted with a dry friction clutch device and disposed in front of the front end of the counter shaft 40. This results in that the friction clutch device 96 can be so arrange to have an increased diameter with out increasing the size of the automatic transmission, so that an increased capacity for transmitting torque is obtained when the vehicle starts running. Further, in general, the dry friction clutch device can be recovered to have an appropriate ability for transmitting power with simple adjustment even though the friction plate is a little worn out, and therefore the friction clutch device 96 used for transmitting the large torque in order to start the vehicle is improved in durability.

Further, when a vehicle to which the embodiment of FIG. 13 is applied is coasting and the first and second one-way clutch devices 71 and 72 is disengaged, the engine-braking state can be obtained with operations of the friction clutch devices 65 and 66, which are provided in the same manner as those in the embodiment of FIG. 6 though it is not shown in FIG. 13, in such a manner as aforementioned in connection with the embodiment of FIG. 6.

Besides, in the case of the reverse speed range, a transmitting path which is the same is the transmitting path constituted for the reverse speed range in the embodiment of FIG. 6 is made up.

Figure 18:
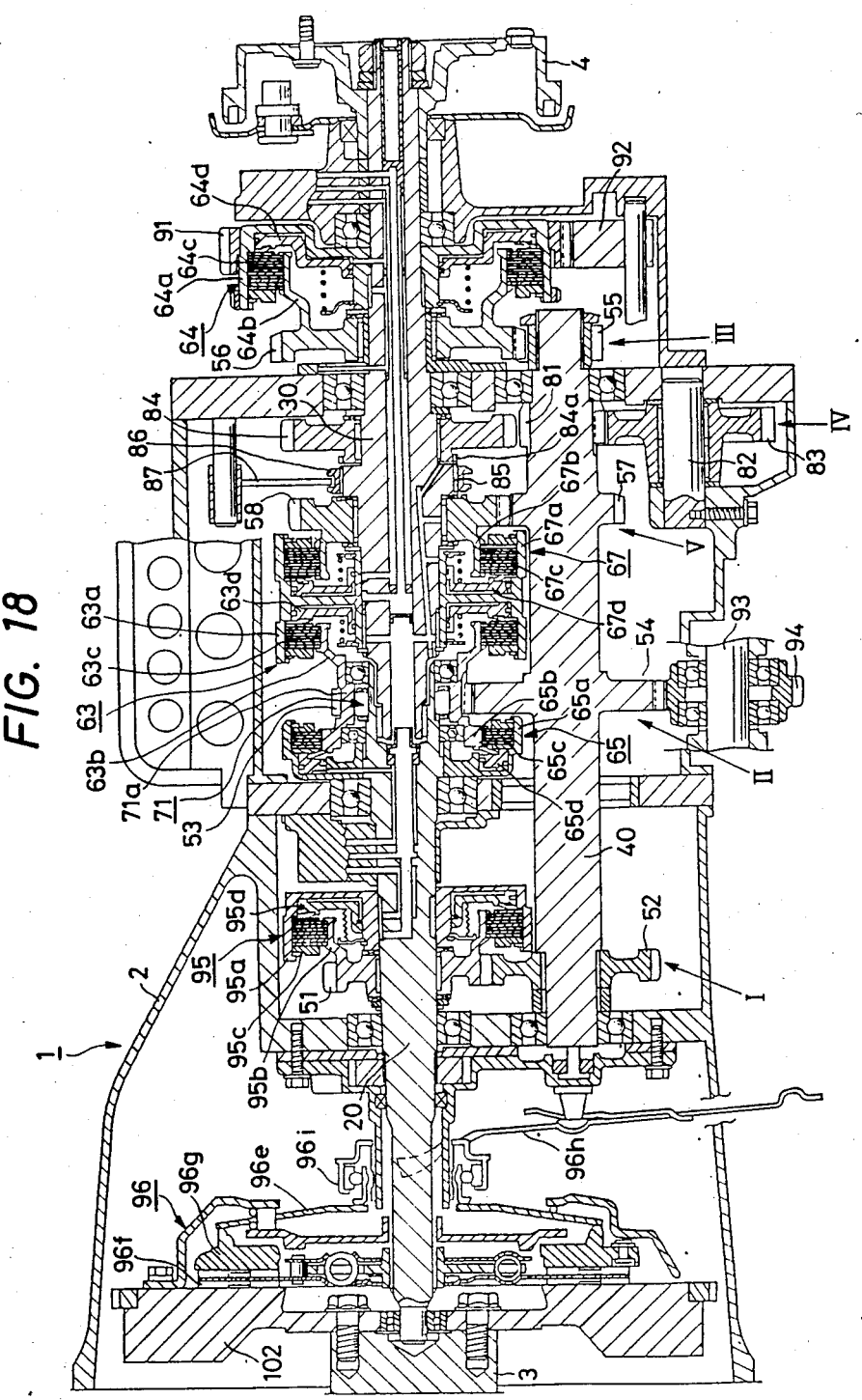
FIG. 18 is a sectional view of a still further embodiment of automatic transmission apparatus according to the present invention.

FIG. 18 shows a still further example of the automatic transmission apparatus according to the present invention. This embodiment corresponds to an automatic transmission apparatus which is obtained by modifying the above mentioned embodiment shown in FIG. 13 to eliminate the second one-way clutch device 72 and the friction clutch device 66 therefrom, so as to have five forward speed ranges.

With the configuration thus constituted, in the case of the first speed range, the friction clutch device 96 and the fourth friction clutch device 64 are held in engagement and the first one-way clutch device 71 is locked. At this time, the rotation of the engine output shaft 3 is transmitted to the counter shaft 40 in the same manner as that transmitted in the state of the first speed range in the embodiment of FIG. 13. Then, the rotation delivered to the counter shaft 40 is transmitted through the fifth and sixth gears 55 and 56 constituting the third gear train III and the fourth friction clutch device 64 to the output shaft 30. In such a transmitting path, the greatest speed reducing ratio for the first speed range is obtained.

In the case of the second speed range, the friction clutch device 95 is held in engagement in addition to the condition of the first speed. Accordingly, the rotation delivered to the input shaft 20 through the friction clutch device 96 is transmitted to the counter shaft 40 in the same manner as that transmitted in the state of the second speed range in the embodiment of FIG. 13. Then the rotation delivered to the counter shaft 40 is transmitted to the output shaft 30 in the same manner as that transmitted in the state of the first speed range. In this transmitting path, since the speed reducing ratio of the first gear train I is smaller than that of the second gear train II used for the first speed range, a speed reducing ratio for the second speed range which is smaller than that for the first speed range is obtained.

In this case, the change to the second speed range from the first speed range is effected by only the engaging action of the friction clutch device 95 in the same manner as the embodiment of FIG. 13.

In the case of the third speed range, the friction clutch devices 96 and 95 and the first one-way clutch device 71 are set in the same manner as those in the state of the second speed range. In addition, the fifth friction clutch device 67 is held in engagement and the fourth friction clutch 64 is released. With such an arrangement, a speed reducing ratio for the third speed range which is smaller than that for the second speed range is obtained in such a manner as aforementioned in connection with the fourth speed range in the embodiment of FIG. 13.

In the case of the fourth speed range, the friction clutch device 96 and the third friction clutch device 63 are held in engagement, the friction clutch device 95 and the fourth and fifth friction clutch devices 64 and 67 are released, and the first one-way clutch device 71 is locked. Accordingly, the rotation of the input shaft 20 is transmitted through the first one-way clutch device 71 and the third friction clutch device 63 to the output shaft 30. This transmitting path does not include any gear train and therefore the directly coupled state is obtained.

Further, in the case of the fifth speed range, the friction clutch device 95 is held in engagement in addition to the condition of the fourth speed range. Accordingly, the rotation of the input shaft 20 is transmitted to the output shaft 30 in the same manner as that transmitted in the state of the sixth speed range in the embodiment of FIG. 13. In such a transmitting path, the rotation is transmitted from the counter shaft 40 to the output shaft 30 through the second gear train II wherein the rotation of the gear 97 is transmitted to the third gear 53 which has a diameter smaller than that of the gear 97 and therefore the rotation of the third gear 53 is increased compared with the rotation of the gear 97. Consequently, the overdrive state for the fifth speed range is established.

In such a manner as described above, each of five forward speed ranges is provided selectively with for gear trains I to III and V, six friction clutch devices 61, 63, 64, 67, 95 and 96 and the one-way clutch devices 71.

Further, when a vehicle to which the embodiment of FIG. 18 is applied is coasting and the first and second one-way clutch devices 71 is disengaged, the engine-braking state can be obtained with the operation of the friction clutch devices 65 which is provided in the same manner as that in each of the embodiments of FIGS. 6 and 13.

Besides, in the case of the reverse speed range, a transmitting path which is the same as the transmitting path constituted for the reverse speed range in each of the embodiments of FIGS. 6 and 13 is made up.

What is claimed is:

1. An automatic transmission apparatus comprising:
    an input shaft,
    an output shaft disposed behind and coaxially with said input shaft,
    a counter shaft disposed substantially parallel to both of said input and output shafts,
    a first gear train including a first gear provided on said input shaft and a second gear provided on said counter shaft to be meshed with said first gear so as to form a first power transmitting path,
    first friction clutch means operative selectively to make and break the first power transmitting path,
    a second gear train including a third gear provided through one-way clutch means on a rear end portion of said input shaft and a fourth gear provided on said counter shaft to be meshed with said third gear so as to form a second power transmitting path,
    second friction clutch means provided at a front end portion of said output shaft and operative selectively to make and break a third power transmitting path from said input shaft through said one-way clutch means to said output shaft,
    a third gear train including a fifth gear provided on a rear end portion of said counter shaft and a sixth gear provided on said output shaft to be meshed with said fifth gear so as to form a fourth power transmitting path, and
    third friction clutch means operative selectively to make and break said fourth power transmitting path;
    said third friction clutch being provided coaxially with the output shaft at the output side of the sixth gear for making the fourth power transmitting means to be used for lower speed ranges and arranged to have a diameter larger than that of each of the first and second friction clutch means.

2. An automatic transmission apparatus according to claim 1 further comprising fourth friction clutch means operative selectively to make and break the second power transmitting path.

3. An automatic transmission apparatus according to claim 2 further comprising additional one-way clutch means provided between said output shaft and said sixth gear.

4. An automatic transmission apparatus according to claim 3 further comprising at least one additional friction clutch means provided in a substantially parallel relation to one of said one-way clutch means and said additional one-way clutch means to be used for engine-braking.

5. An automatic transmission apparatus according to claim 2, wherein each of said first, second, third and fourth friction clutch means comprises a wet multi-plate clutch device.

6. An automatic transmission apparatus according to claim 5 further comprising a dry friction clutch device for coupling said input shaft with an output shaft of an engine.

7. An automatic transmission apparatus according to claim 2 further comprising a fourth gear train including a seventh gear provided on said counter shaft and a eighth gear provided on said output shaft to be meshed with said seventh gear so as to form a fifth power transmitting path, and fifth friction clutch means operative selectively to make and break the fifth power transmitting path.

8. An automatic transmission apparatus according to claim 7 further comprising additional one-way clutch means provided between said output shaft and said sixth gear.

9. An automatic transmission apparatus according to claim 8 further comprising at least one additional friction clutch means provided in a substantially parallel relation to one of said one-way clutch means and said additional one-way clutch means to be used for engine-braking.

10. An automatic transmission apparatus according to claim 7, wherein each of said first, second, third, fourth and fifth friction clutch means comprises a wet multiplate clutch device.

11. An automatic transmission apparatus according to claim 10 further comprising a dry friction clutch device for coupling said input shaft with an output shaft of an engine.

12. An automatic transmission apparatus according to claim 1 further comprising a reverse gear train which includes a driving gear provided on said counter shaft, an idle gear provided on an idle shaft to be meshed with said driving gear and a follower gear provided on said output shaft to be meshed with said idle gear so as to form an additional power transmitting path for a reverse speed range, and coupling means for making the additional power transmitting path effective and ineffective selectively.

13. An automatic transmission apparatus according to claim 1 further comprising additional friction clutch means for coupling said input shaft with an output shaft of an engine, said additional friction clutch means comprising a dry friction clutch device.

14. An automatic transmission apparatus comprising:
an input shaft,
an output shaft disposed behind and coaxially with said input shaft,
a counter shaft disposed substantially parallel to both of said input and output shafts,
a first gear train including a first gear provided on said input shaft and a second gear provided on said counter shaft to be meshed with said first gear so as to form a first power transmitting path,
first friction clutch means operative selectively to make and break the first power transmitting path,
a second gear train including a third gear provided through one-way clutch means on a rear end portion of said input shaft and fourth gear provided on said counter shaft to be meshed with said third gear so as to form a second power transmitting path,
second friction clutch means provided at a front end portion of said output shaft and operative selectively to make and break a third power trannsmitting path from said input shaft through said one-way clutch means to said output shaft,
a third gear train including a fifth gear provided on a rear end portion of said counter shaft and a sixth gear provided on said output shaft to be meshed with said fifth gear so as to form a fourth power transmitting path,
third friction clutch means operative selectively to make and break said fourth power transmitting path, and
fourth friction clutch means operative selectively to make and break the second power transmitting path, wherein said second and fourth power transmitting paths are made for a first speed range, said first and fourth power transmitting paths are made for a second speed range, said third power transmitting path is made for a third speed range, and said first and second power transmitting paths and a supplemental power transmitting path from said second gear train through said second friction clutch means to said output shaft are made for a fourth speed range.

15. An automatic transmission apparatus comprising:
an input shaft,
an output shaft disposed behind and coaxially with said input shaft,
a counter shaft disposed substantially parallel to both of said input and output shafts,
a first gear train including a first gear provided on said input shaft and a second gear provided on said counter shaft to be meshed with sid first gear so as to form a first power transmitting path,
first friction clutch means operative selectively to make and break the first power transmitting path,
a second gear train including a third gear provided through one-way clutch means on a rear end portion of said input shaft and a fourth gear provided on said counter shaft to be meshed with said third gear so as to form a second power transmitting path,
second friction clutch means provided at a front end portion of said output shaft and operative selectively to make and break a third power transmitting path from said input shaft through said one-way clutch means to said output shaft,
a third gear train including a fifth gear provided on a rear end portion of said counter shaft and a sixth gear provided on said output shaft to be meshed with said fifth gear so as to form a fourth power transmitting path,
third friction clutch means operative selectively to make and break said fourth power transmitting path,
fourth friction clutch means operative selectively to make and break the second power transmitting path,
a fourth gear train including a seventh gear provided on said counter shaft and an eighth gear provided on said output shaft to be meshed with said seventh gear so as to form a fifth power transmitting path, and
fifth friction clutch means operative selectively to make and break the fifth power transmitting path, wherein said second and fourth power transmitting paths are made for a first speed range, said first and fourth power transmitting paths are made for a second speed range, said second and fifth power transmitting paths are made for a third speed range, said first and fifth power transmitting paths are made for a fourth speed range, said third power transmitting path is made for a fifth speed range, and said first and second power transmitting paths and a supplemental power transmitting path from said second gear train through said second friction clutch means to said output shaft are made for a sixth speed range.

* * * * *